United States Patent [19]

Winship

[11] Patent Number: 5,168,239

[45] Date of Patent: Dec. 1, 1992

[54] METHOD AND APPARATUS FOR ADJUSTING THE THRESHOLD FOR DETERMINING THE THICKNESS OF OR THE NUMBER OF SHEETS IN A SHEET MATERIAL

[75] Inventor: Peter L. Winship, Albany, Calif.

[73] Assignee: Teknekron Communications Systems, Inc., Berkeley, Calif.

[21] Appl. No.: 597,733

[22] Filed: Oct. 15, 1990

[51] Int. Cl.⁵ .............................. G01R 27/26
[52] U.S. Cl. .................. 324/671; 324/606; 324/684
[58] Field of Search ............. 324/662, 663, 671, 673, 324/605, 606, 602, 684

[56] References Cited

U.S. PATENT DOCUMENTS

| | | |
|---|---|---|
| 3,523,246 | 8/1970 | Hall et al. |
| 3,990,005 | 11/1976 | Abbe et al. |
| 4,086,528 | 4/1978 | Walton. |
| 4,910,453 | 3/1990 | Abbe et al. ............ 324/663 |
| 4,935,700 | 6/1990 | Garbini et al. .......... 324/662 X |

*Primary Examiner*—Jack B. Harvey
*Attorney, Agent, or Firm*—Limbach & Limbach

[57] ABSTRACT

Two capacitive sensors are positioned on opposite sides of the sheet material, having their outputs connected additively. The output of the capacitive sensors is then supplied to a comparator to which a known reference voltage is also supplied. An adaptive circuit adaptively changes the reference voltage.

12 Claims, 4 Drawing Sheets

IMPROVED APPARATUS

IMPROVED APPARATUS

IMPROVED APPARATUS

IMPROVED APPARATUS

METHOD AND APPARATUS FOR ADJUSTING THE THRESHOLD FOR DETERMINING THE THICKNESS OF OR THE NUMBER OF SHEETS IN A SHEET MATERIAL

TECHNICAL FIELD

The present invention relates to a method and an apparatus for adjusting the threshold for determining the thickness of or the number of sheets in a sheet material.

BACKGROUND OF THE INVENTION

Methods and apparatuses for detecting the thickness of a sheet material or the number of sheets in a sheet material are well known in the art. One type of sensor which has been used heretofore is a capacitive sensor wherein the sheet material passing in proximity to the capacitive sensor generates a voltage dependent upon the capacitance of the sheet material.

However, capacitance is dependent upon several factors: among them are the distance of the sheet material away from the sensor, and the characteristics of the sheet material (such as thickness or the number of sheets). Thus, the capacitive sensor of the prior art cannot discriminate between a single sheet of the sheet material in proximity to the capacitive sensor versus a plurality of sheets further away from the capacitive sensor. In both cases, the capacitance reading could be the same.

One solution to this prior art problem is to have mechanical holding means to hold the sheet material at a preset distance from the capacitive sensor. However, this requires additional mechanical equipment. Further, throughput degrades because the sensor is intended to be used in an environment where the sheet material is moving rapidly and the sensor is intended to measure large volume of sheet material flowing through the system.

A second prior art solution to this problem is to place each capacitor plate of the capacitive sensor on opposite sides of the sheet material, instead of placing them on one side of the sheet material, as in the first prior art described above. In this arrangement, the movement of the sheet material away from one plate results in a movement toward the other plate, with no resultant change in capacitance. In this scheme, however, the capacitor plates must be widely separated in order to accommodate the placement of the sheet material between them. This results in a very significant decrease in the sensitivity of the capacitive sensor.

Capacitive sensors employ an AC stimulation voltage to measure the overall capacitance between their sensor plates. If the capacitor plates are more separated, the stimulation signal must be operated at an elevated frequency or strength in order to overcome the loss in capacitance caused by the increased separation. The higher frequency or stronger stimulation signals are more difficult to generate and more difficult to convey to the capacitor plates. They also require special shielding arrangements to prevent excess radiation of the stimulation signals out of the equipment.

Another means of compensation for the decreased sensitivity caused by separation of capacitor plates is to increase their size. This has a deleterious effect on the overall compactness of the apparatus however, because the plate size must be very much larger than the original size in order to achieve equal sensitivity. Further, the increased plate size results in poorer spatial resolution of smaller sheets of sheet material, as well as decreased resolution of the edges of the sheet material.

The signal generated by the sensor is compared to a fixed reference voltage. Since the reference signal is fixed, any change in the operating condition, such as humidity, which changes the signal from the sensor, but is not reflective of a change in the number of sheets or the thickness of the sheet material may result in an erroneous reading.

SUMMARY OF THE INVENTION

In accordance with the present invention, an improved method and apparatus for adjusting the threshold for determining the thickness of a sheet material or the number of sheets of a sheet material is disclosed. The invention comprises a first capacitive sensor for generating a first known voltage in response to the detection of the sheet material. The first capacitive sensor is placed on one side of the sheet material. The apparatus further comprises a second capacitive sensor for generating a second voltage in response to the detection of the sheet material. The second capacitive sensor is placed on the other side of the sheet material, opposite to the first capacitive sensor. The first voltage and the second voltage are added to form a combined (sum) voltage. The combined voltage is compared to a reference voltage. The reference voltage is adaptively changed in response to operating conditions. The result of the comparison is indicative of the thickness of the sheet material or the number of sheets of the sheet material passing through the apparatus.

BRIEF DESCRIPTION OF THE DRAWINGS

FIG. 4 is a schematic block diagram of one embodiment of a circuit to generate an adaptively changing reference voltage.

DETAILED DESCRIPTION OF THE DRAWINGS

Figure 1A:
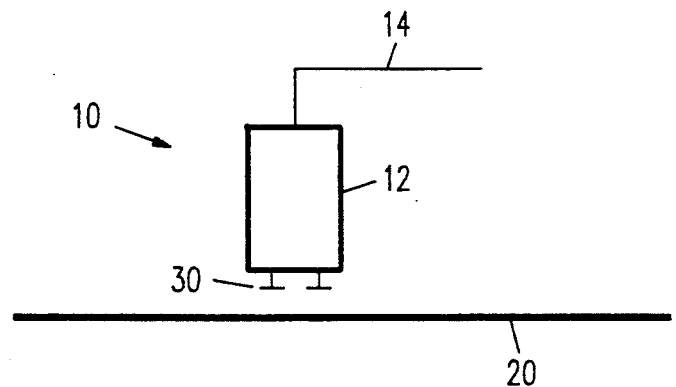
FIG. 1a is a schematic drawing of a capacitive sensor of the prior art with FIG. 1b showing the positions of the plates of the capacitor to be measured.

Referring to FIG. 1a there is shown a capacitive sensor 10 placed in the manner of the prior art. The capacitive sensor 10 comprises a housing 12 which contains an electronic circuit to measure the capacitance of a capacitor 30, and an electrical lead 14. A sheet material 20 is directed to pass close to the capacitive sensor 10. The voltage on electrical lead 14 is indicative of the capacitance in the region close to the capacitor 30. The capacitance of capacitor 30 is in turn indicative of the properties of the sheet material 20, including the thickness and number of sheets.

Figure 1B:
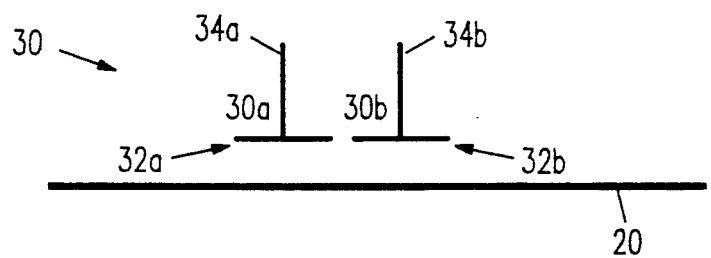
FIG. 1c shows a schematic diagram of the comparison of the voltage generated by the prior art sensor and compared to a reference voltage.

FIG. 1b shows capacitor 30 in more detail. A first electrical lead 34a is connected to the first plate 32a. A second electrical lead 34b is connected to the second plate 32b. The value of capacitance of capacitor 30 is changed in response to the sheet material 20 passing near to the first and second plates 32a and 32b.

Figure 1C:
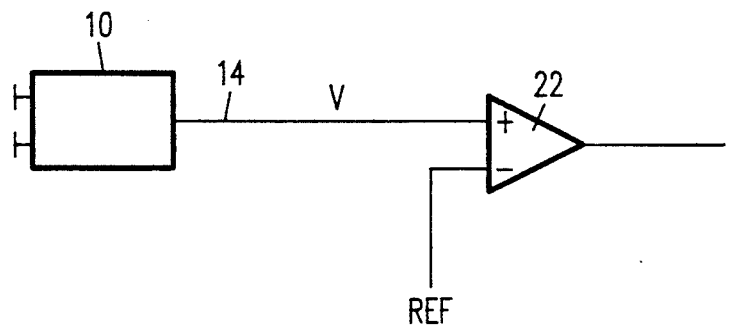

In FIG. 1c, the capacitive sensor 10 generates a voltage V on electrical lead 14 which is connected to the comparator 22 and is indicative of the measured capacitance. Another input to the comparator 22 is a known reference voltage. The result of the comparison by the comparator 22 is a signal indicating that the thickness or number of sheets of the sheet material exceeds a threshold established by the reference voltage.

The reference voltage supplied to the comparator 22 is typically a reference voltage indicative of a single sheet of the sheet material 20. However, the reference voltage can be a voltage representative of any number of sheets of the sheet material or the thickness of the sheet material. Thus, the comparison between the voltage generated by the capacitance sensor 10 and the reference voltage would indicate the number of sheets of the sheet material 20 or the thickness of the sheet material 20.

More generally, the output of comparator 22 can be indicative of any property of the sheet material that is capable of altering the measured capacitance. Thus it can be used to discriminate between different types of sheet material, or variations in moisture content of a sheet material.

As previously discussed, the shortcoming of the capacitive sensor 10 of the prior art is that the capacitive sensor 10 is unable to distinguish between a relatively thick sheet material 20 far away from the capacitive sensor 10 versus a relatively thin sheet material 20 close to the capacitive sensor 10, with both generating the same or approximately the same voltage V.

Figure 2A:
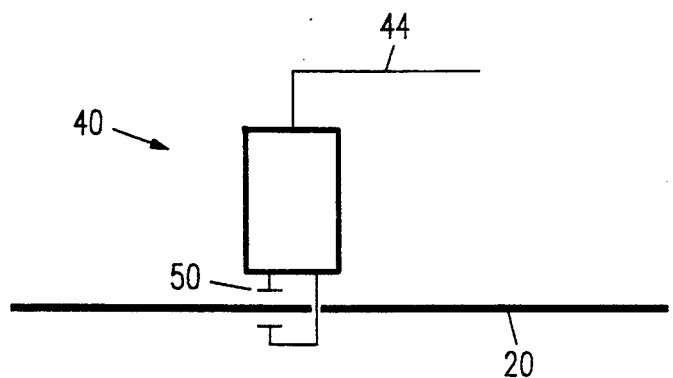
FIG. 2a is a schematic drawing of the second type of capacitive sensor of the prior art with FIG. 2b showing the positioning of the plates of the capacitor to be measured.
Figure 2B:
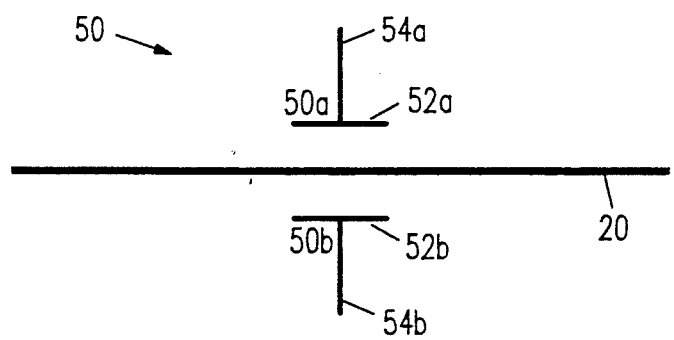
FIG. 2c is a schematic diagram of the comparison of the voltage generated by the second prior art sensor and compared to a reference voltage.
Figure 2C:
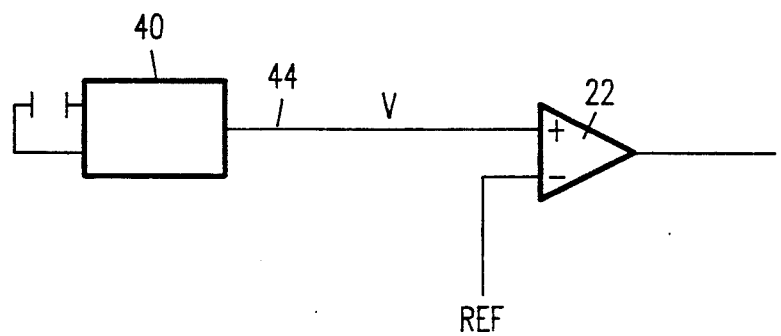

Referring to FIG. 2a, there is shown a second type of capacitive sensor 40 of the prior art. The difference between the sensor 40 of FIG. 2 and the sensor 10 of FIG. 1 is in the placement of the capacitor plates. Referring to FIG. 2b, the capacitor plates 50a and 50b are shown placed on opposite sides of sheet material 20. The sheet material 20 passes between the plates 50a and 50b. The advantage of the prior art device of FIG. 2b compared to the device of FIG. 1b is that the resultant capacitance of capacitor 50 is indicative of the thickness or number of sheets of sheet material 20, but not of the distance of the sheet material 20 to any one plate 50a or 50b. This is because as the sheet material 20 nears one plate of the capacitor 50, it must also become more distant from the other plate, resulting in no net capacitance change in the capacitor 50. The voltage on the output lead 44 of FIG. 2a is therefore not indicative of position of the sheet material 20 between the plates of capacitor 50. The voltage on the output lead 44 is, however, subject to change depending upon the number of sheets or the thickness of the sheet material 20. FIG. 2c shows the connection of capacitive sensor 40 to the comparator 22. This is identical to FIG. 1c.

Figure 3A:
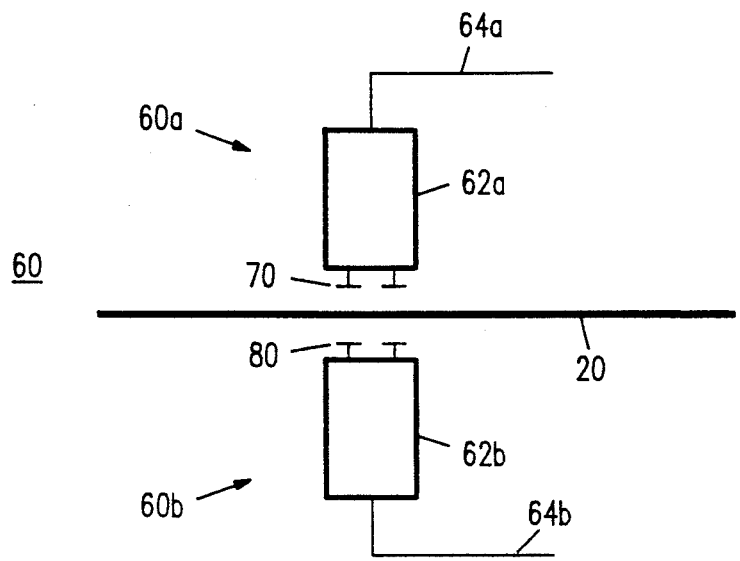
FIG. 3a is a schematic drawing of the improved capacitive sensor portion of the apparatus of the present invention.
Figure 3B:
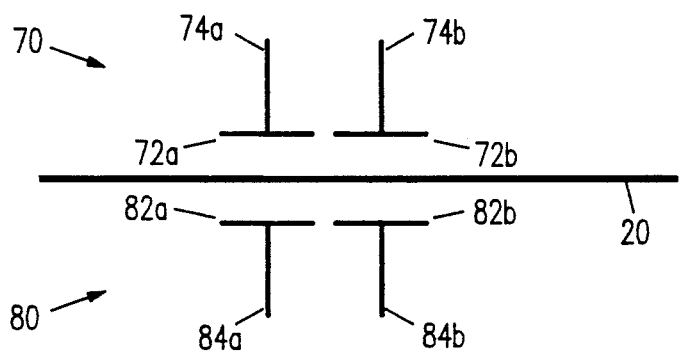
FIG. 3b is a schematic diagram showing the positioning of the plates of the two capacitors to be measured.

Referring to FIG. 3a, there is shown a sensor portion 60 of the apparatus 90 of the present invention. The sensor portion 60 comprises a pair of capacitive sensors 60a and 60b, each of which is of the same type as the capacitive sensor 10 shown in FIG. 1a. Each of the capacitive sensors 60a and 60b has a pair of plates 70 and 80 and a pair of leads 74 and 84, similar to the capacitive sensor 10. The sheet material 20 passes through and is between the two sensors 60a and 60b.

Figure 3C:
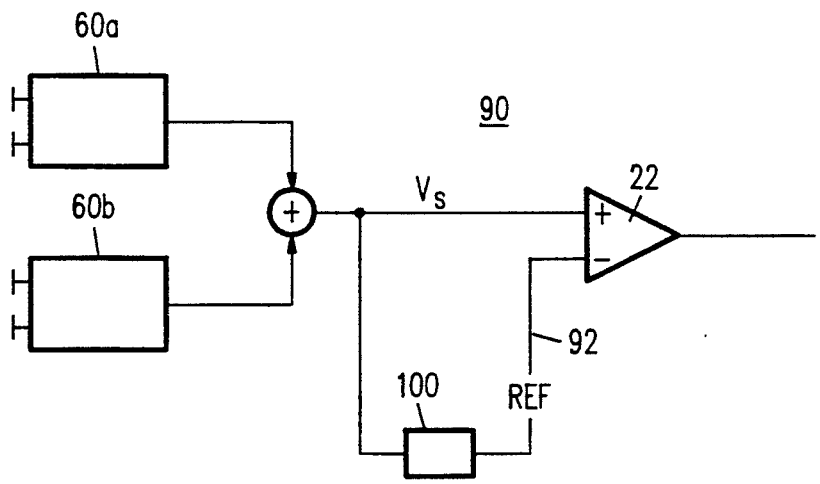
FIG. 3c is a schematic diagram showing the connection of the capacitive sensor of FIG. 3a, connected, and being compared to a reference voltage.

Referring to FIG. 3c, there is shown the apparatus 90 of the present invention. The apparatus 90 comprises the pair of capacitive sensors 60a and 60b connected in combination to generate a first voltage V. The voltages produced by capacitive sensors are combined additively to produce a sum voltage V. This voltage is supplied to a comparator 22. The sum voltage $V_s$ is also supplied to an adaptive circuit 100, which generates an adaptively changing reference voltage 92. The reference voltage 92 is supplied as the other input to the comparator 22. The output of the comparator 22 is determinative of the thickness of the sheet material 20 or the number of sheets of the sheet material passing between the capacitive sensors 60a and 60b.

One of the uses of the apparatus 90 of the present invention is in detecting the thickness or the number of sheets of paper. More particularly, one of the uses of the apparatus 90 is to detect the presence of two sheets of paper. Since the capacitance of paper measured by the capacitive sensors 60a and 60b depends in part upon the humidity, temperature and other operational conditions, the present invention also adaptively changes the reference voltage that is representative of a single sheet of paper.

Figure 4:
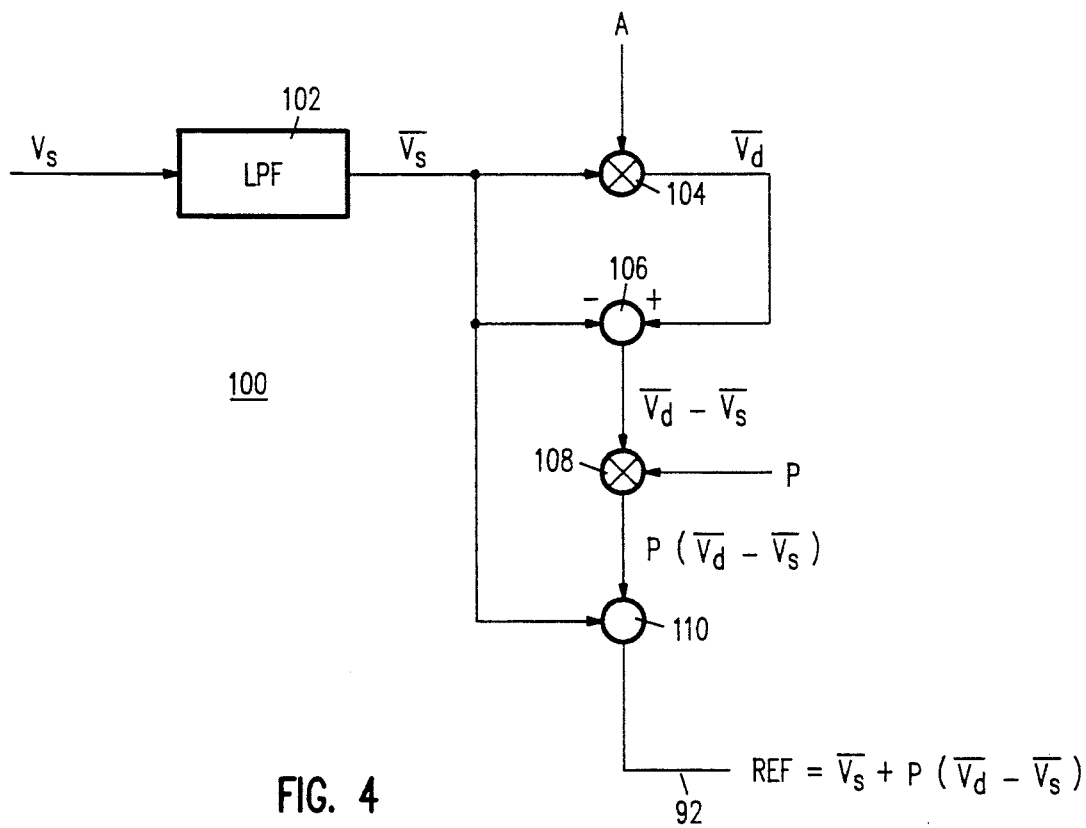
FIG. 4 is a schematic block diagram showing the connection of the capacitive sensor of FIG. 3a, connected, and being compared to a reference voltage.

Referring to FIG. 4, there is a circuit 100 for generating a reference voltage 92 which adaptively changes the reference voltage 92 or the threshold voltage. The voltage $V_s$ from the output of the capacitive sensor 60 is supplied to a low pass filter 102 which produces an output voltage $\overline{V}_s$. $\overline{V}_s$ voltage is the average value of the voltage which is the output of the capacitive sensor 60. The output of the low pass filter 102, $\overline{V}_s$, is supplied to a first multiplier 104 to which a first constant A is multiplied to produce a voltage $\overline{V}_d$. $\overline{V}_s$ and $\overline{V}_d$ are estimates of the voltage measured by the capacitive sensor 60 for a single sheet and a double sheet, respectively. These voltages are then supplied to a first adder 106 which generates the voltages $\overline{V}_d$ minus $\overline{V}_s$. The output of the first adder 106 is then supplied to a second multiplier 108 to which a second constant P is also supplied. The output of the second multiplier 108 is the voltage $P*(\overline{V}_d - \overline{V}_s)$. The result of the second multiplier 108 is then supplied to a second adder 110. $\overline{V}_s$ is also supplied to the second adder 110. The output of the second adder 110 is the reference voltage which is equal to $\overline{V}_s + P*(\overline{V}_d - \overline{V}_s)$. For P between 0 and 1, the reference voltage will be between $\overline{V}_s$ and $\overline{V}_d$.

The circuit 100 is first calibrated. This is performed by placing two sheets of paper in the space between the capacitive sensors 60a and 60b. The resultant voltage is supplied to the low pass filter 102 to produce a voltage, $\overline{V}_s(2)$. The value of this voltage is noted. Thereafter, a single sheet is placed between the sensors 60a and 60b. The resultant output of the low pass filter, $\overline{V}_s$ is supplied to the multiplier 104 and the constant value A is adjusted until $\overline{V}_d$ is equal to the previously measured voltage $\bar{V}_s(2)$. In this manner, the calibration constant of A is determined. The calibration constant of P is fixed between 0 and 1 and depends on statistical data concerning sensor and paper characteristics.

During normal operation, the low pass filter 102 is arranged such that it operates only when there are sheets of paper in the capacitive sensor 60. Its output is held fixed otherwise. The sheet material 20 periodically passes through the capacitive sensor 60 and the low pass filter 102 is allowed slowly to adjust its output $\bar{V}_s$ to the average value of the sensor voltage. When the great majority of papers which pass through the sensors are single sheet, the output of the low pass filter 102 $\bar{V}_s$ is a good approximation of the average sensor voltage output for single sheets. $\bar{V}_d$ is multiplied by A to produce the voltage $\bar{V}_d$ which is a good estimate of the sensor output which would appear if two sheets of paper pass through the capacitive sensor 60.

When two sheets of paper pass through the capacitive sensor 60, the output $V_s$ would be greater than the reference voltage and the result of the comparator 42 produces a double sheet indication.

The low pass filter circuit 102 tracks the average sensor reading so that when the average readings change, the value of $\bar{V}_s$ follows the changes. The fixed multiplier A provides a tracking of the double sheet level and therefore provides for an adjustment for the reference voltage as well.

As can be seen from the foregoing, the adaptive circuit 100 also takes into count the operational characteristics of the paper and the environment.

Figure 5:
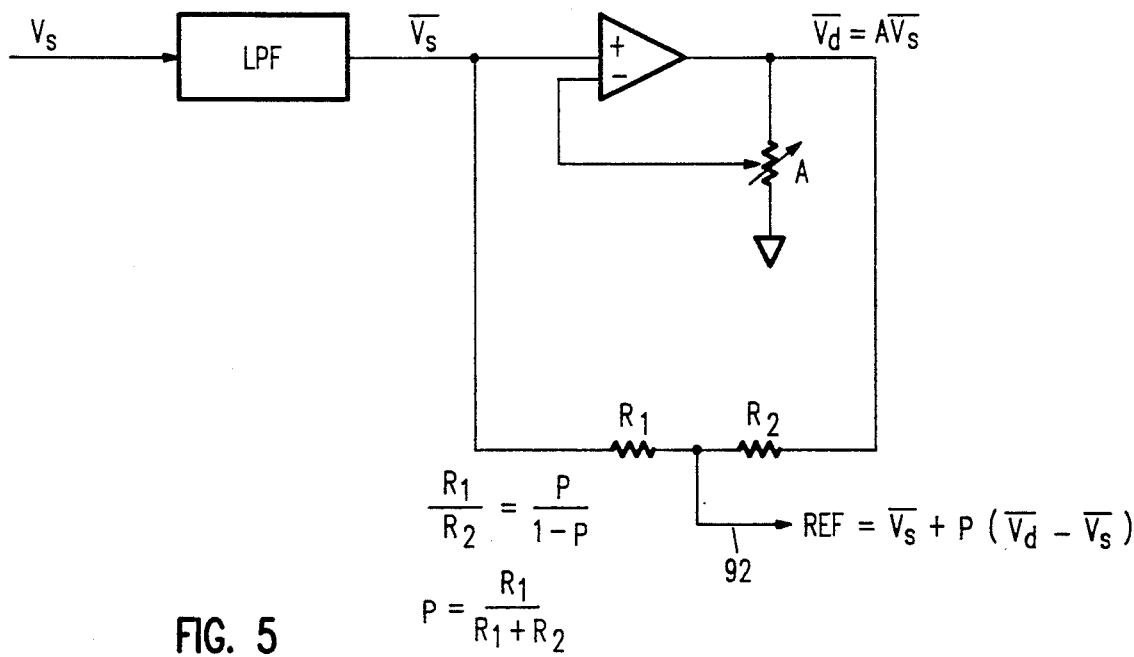
FIG. 5 is a detailed circuit diagram of the one embodiment shown in FIG. 4.

Referring to FIG. 5 there is shown a detailed circuit diagram of the adaptive circuit 100 shown in FIG. 4.

From the foregoing, it can be appreciated that the adaptively changing circuit 100 provides changes to the operational conditions such that greater accuracy can be achieved. Further, the circuit 100 can be used with any sensor—even sensors of the prior art.

What is claimed is:

1. An apparatus for determining the thickness or the number of a sheet material, said apparatus comprising:
   a first capacitive sensor means for measuring the capacitance of said sheet material and for generating a first voltage in response thereto;
   a second capacitive sensor means for measuring the capacitance of said sheet material and for generating a second voltage in response thereto;
   said first and second capacitance sensor means positioned on opposite sides of said sheet material;
   means for connecting said first and second capacitance sensor means by combining said first voltage additively to said second voltage to form a combined voltage;
   means for receiving a reference voltage, wherein said reference voltage is representative of a known thickness or a known number of said sheet material; and for adaptively changing said reference voltage to generate a changed reference volta; and
   means for comparing said combined voltage to said changed reference voltage.

2. The apparatus of claim 1 wherein said changing means further comprising:
   first processing means for receiving said combined voltage and for processing said combined voltage to produce a first known voltage;
   second processing means for receiving said combined voltage and for processing said combined voltage to produce a second known voltage; and
   third processing means for receiving said first and second known voltages for processing said first and second known voltages to produce said changed reference voltage, wherein said changed reference voltage is between said first and second known voltages.

3. The apparatus of claim 2 wherein said first processing means is a low pass filter.

4. The apparatus of claim 2 wherein said second processing means further comprises:
   a low pass filter for generating said first known voltage; and
   a multiplying circuit for receiving said first known voltage and for multiplying said first known voltage by a first constant to produce said second known voltage.

5. The apparatus of claim 2 wherein said third processing means comprises:
   means for subtracting said first known voltage from said second known voltage to produce a subtracted voltage;
   means for receiving said subtracted voltage and for multiplying said subtracted voltage by a second constant to produce a multiplied voltage; and
   means for summing said first known voltage to said multiplied voltage to produce said reference voltage.

6. The apparatus of claim 1 wherein said sheet material is paper.

7. A method of determining the thickness or the number of a sheet material, said method comprising:
   measuring the capacitance of said sheet material and for generating a first voltage in response thereto;
   measuring the capacitance of said sheet material and for generating a second voltage in response thereto;
   combining additively said first voltage to said second voltage to form a combined voltage;
   adaptively changing a reference voltage to produce a changed reference voltage, wherein said reference voltage is representative of a known thickness or a known number of sheet material; and
   comparing said combined voltage to said changed reference voltage to determine the thickness or the number of a sheet material.

8. The method of claim 7 wherein said changing step further comprising:
   processing said combined voltage to produce a first known voltage;
   processing said combined voltage to produce a second known voltage; and
   processing said first and second known voltages to produce said changed reference voltage, wherein said changed reference voltage is between said first and second known voltages.

9. The method of claim 8 wherein said processing step to produce a second known voltage further comprises:
   receiving said first known voltage; and
   multiplying said first known voltage by a first constant to produce said second known voltage.

10. The method of claim 9 wherein said processing the first and second known voltage step further comprises:
    subtracting said first known voltage from said second known voltage to produce a subtracted volta;
    multiplying said subtracted voltage by a second constant to produce a multiplied voltage; and summing said first known voltage to said multiplied voltage to produce said reference voltage.

11. An adaptive circuit for receiving a first signal representative of the detection of the thickness or the number of a sheet of material, detected in a normal operation, and for generating a reference signal in response thereto, said circuit comprising:

means for filtering said first signal through a low pass filter to produce a second signal;

means for generating a third signal, representative of the detection of the thickness or the number of a sheet material detected in an abnormal operation;

means for subtracting said second signal from said third signal to produce a fourth signal;

means for multiplying said fourth signal by a constant between 0 and 1, to produce a fifth signal; and means for adding said fifth signal and said second signal to produce said reference signal.

12. The circuit of claim 11 wherein said means for generating said third signal comprises means for multiplying said second signal by a constant determined during calibration.

* * * * *